US012545109B2

(12) United States Patent
Cho

(10) Patent No.: US 12,545,109 B2
(45) Date of Patent: Feb. 10, 2026

(54) SMART NOTIFICATION DEVICE FOR VEHICLE AND METHOD THEREOF

(71) Applicants: Hyundai Motor Company, Seoul (KR); Kia Corporation, Seoul (KR)

(72) Inventor: Jeong Min Cho, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 142 days.

(21) Appl. No.: 18/512,943

(22) Filed: Nov. 17, 2023

(65) Prior Publication Data

US 2024/0326857 A1    Oct. 3, 2024

(30) Foreign Application Priority Data

Mar. 31, 2023  (KR) .......................... 10-2023-0042910

(51) Int. Cl.
*B60K 35/28* (2024.01)
*B60K 35/10* (2024.01)
(Continued)

(52) U.S. Cl.
CPC .......... *B60K 35/28* (2024.01); *B60W 30/0956* (2013.01); *B60W 40/08* (2013.01);
(Continued)

(58) Field of Classification Search
CPC .. B60W 50/16; B60W 30/0956; B60W 40/08; B60W 60/0016; B60W 2050/143; B60W 2050/146; B60W 2540/225; B60W 2540/227; B60W 30/0953; B60W 50/14; B60W 2540/223; B60W 40/02; B60K 35/00; B60K 35/10; B60K 35/23; B60K 35/28; B60K 35/29; B60K 35/60; B60K 2360/149; B60K 2360/177; B60K 2360/178; B60K 2360/1868; B60K 2360/188; B60K 2360/334;
(Continued)

(56) References Cited

U.S. PATENT DOCUMENTS

2003/0209893 A1* 11/2003 Breed .................... B60N 2/267
                                                            701/45
2017/0050542 A1*  2/2017 Shigeta ................ B60K 35/234
(Continued)

*Primary Examiner* — Omeed Alizada
(74) *Attorney, Agent, or Firm* — SLATER MATSIL, LLP

(57) ABSTRACT

An embodiment of a smart notification device for a vehicle configured for autonomous driving, includes an occupant recognition unit configured to sense occupant state information of an occupant in the vehicle, a vehicle recognition unit configured to sense vehicle state information and driving information of the vehicle, a memory storing code, and a processor configured to access the memory and execute the code. The code can include instructions for the processor to collect the occupant state information, the vehicle state information, and the driving information, set a risk of collision based on the collected information, determine the set risk of collision based on a preset risk level, and generate a risk object corresponding the risk of collision. The device of an embodiment includes an augmented reality graphics system configured to project the risk object onto a glass of the vehicle based on a determination result obtained by the determining.

15 Claims, 8 Drawing Sheets

(51) Int. Cl.
- *B60K 35/23* (2024.01)
- *B60K 35/29* (2024.01)
- *B60K 35/60* (2024.01)
- *B60W 30/095* (2012.01)
- *B60W 40/08* (2012.01)
- *B60W 50/14* (2020.01)
- *B60W 50/16* (2020.01)
- *B60W 60/00* (2020.01)

(52) U.S. Cl.
CPC ........ *B60W 50/16* (2013.01); *B60W 60/0016* (2020.02); *B60K 35/10* (2024.01); *B60K 35/23* (2024.01); *B60K 35/29* (2024.01); *B60K 35/60* (2024.01); *B60K 2360/149* (2024.01); *B60K 2360/177* (2024.01); *B60K 2360/178* (2024.01); *B60K 2360/1868* (2024.01); *B60K 2360/188* (2024.01); *B60K 2360/334* (2024.01); *B60K 2360/785* (2024.01); *B60W 2050/143* (2013.01); *B60W 2050/146* (2013.01); *B60W 2540/225* (2020.02); *B60W 2540/227* (2020.02)

(58) Field of Classification Search
CPC ........ B60K 2360/785; B60K 2360/175; B60K 2360/21; B60K 35/25; B60K 35/26; B60K 35/285; B60K 2360/66; B60Y 2400/90; B60Y 2400/92
See application file for complete search history.

(56) References Cited

U.S. PATENT DOCUMENTS

| | | | |
|---|---|---|---|
| 2020/0166746 A1* | 5/2020 | Green | B60K 35/28 |
| 2020/0307456 A1* | 10/2020 | Michiguchi | G06T 3/00 |
| 2020/0391591 A1* | 12/2020 | Kim | B60W 30/08 |
| 2021/0165220 A1* | 6/2021 | Nakada | G02B 27/0101 |

* cited by examiner

SMART NOTIFICATION DEVICE FOR VEHICLE AND METHOD THEREOF

CROSS-REFERENCE TO RELATED APPLICATIONS

This application claims the benefit of Korean Patent Application No. 10-2023-0042910, filed on Mar. 31, 2023, which application is hereby incorporated herein by reference.

TECHNICAL FIELD

The present disclosure relates to a smart notification device and method for a vehicle.

BACKGROUND

Recently, autonomous driving technology providing level 4 (Lv. 4) or higher autonomous driving that operates without a driver is in development. When such a service is provided, there may be a sense of difference in driving between what occupants in a vehicle feel and what a system performs during general intervention in a dangerous situation, which may make the occupants feel uncomfortable.

For example, when the vehicle performs a sudden operation (e.g., braking or steering avoidance) during autonomous driving at level 4 (Lv. 4) or higher, at which autonomous driving is performed without a driver, the occupants in a defenseless state may feel greatly threatened or displeased. Therefore, it is necessary to determine a risk of collision and intuitively notify occupants of a corresponding result in various ways including visual, tactile, and auditory ways.

SUMMARY

The present disclosure relates to a smart notification device and method for a vehicle and, in particular embodiments, to a smart notification device and method for a vehicle that may display in real time a warning about a risk of collision on the glass of the vehicle using an augmented reality head-up display (AR HUD) and may thereby allow occupants in the vehicle to accurately recognize a surrounding environment of the vehicle that changes based on the risk of collision.

To solve the technical issues described above, an embodiment of the present disclosure provides a smart notification device and method for a vehicle that may display in real time a warning about a risk of collision on the glass (or windows) of the vehicle using an augmented reality head-up display (AR HUD) and may thereby allow occupants in the vehicle to accurately recognize a surrounding environment of the vehicle changing according to the risk of collision.

The technical issues to be solved by an embodiment of the present disclosure are not necessarily limited to what has been described above, and other technical issues not described above may also be clearly understood by one of ordinary skill in the art to which the present disclosure pertains from the following description.

According to an embodiment of the present disclosure, there is provided a method of operating a smart notification device for a vehicle comprising a processor. The method can include, under the control of the processor, sensing occupant state information of an occupant in the vehicle, sensing vehicle state information of the vehicle that is autonomously driving and driving information of the vehicle, collecting the occupant state information, the vehicle state information, and the driving information, setting a risk of collision based on the collected information, and determining the set risk of collision based on a preset risk level; and projecting a risk object, which is an object having the risk, onto a glass of the vehicle based on a determination result obtained by the determining.

In addition, projecting the risk object onto the glass of the vehicle may include, under the control of the processor, displaying the risk object such that the risk object is overlaid with a real object through augmented reality (AR) graphics.

In addition, projecting the risk object onto the glass of the vehicle may include, under the control of the processor, projecting the risk object in different colors according to the determination result.

In addition, a method of an embodiment may include, under the control of the processor, sensing an operation of a vehicle seat position of the vehicle, sensing a movement of a seat in the vehicle, calculating a position of the seat in the vehicle based on a sensed position of the seat in the vehicle, and determining a position of the occupant based on the calculated position of the seat in the vehicle.

In addition, a method of an embodiment may include under the control of the processor, sensing a gaze of the occupant based on the determined position of the occupant, and setting the glass of the vehicle onto which the risk object is to be projected based on the sensed gaze of the occupant.

In addition, a method of an embodiment may include, under the control of the processor, correcting a focus of the risk object based on the set glass of the vehicle and the gaze of the occupant.

In addition, a method of an embodiment may include, under the control of the processor, in response to the determination result being greater than or equal to the preset risk level, outputting a notification of the risk of collision, and outputting the notification through at least one of visual, auditory, and tactile senses of the occupant.

In addition, a method of an embodiment may include, in response to the risk of collision being set to first to fourth levels, outputting differently the notification of the risk of collision or displaying differently a color of the risk object, according to the set first to fourth levels.

According to an embodiment of the present disclosure, there is provided a smart notification device for a vehicle having a processor, wherein the processor is configured to sense occupant state information of an occupant in the vehicle, sense vehicle state information of the vehicle that is autonomously driving and driving information of the vehicle, collect the occupant state information, the vehicle state information, and the driving information, set a risk of collision based on the collected information, and determine the set risk of collision based on a preset risk level, and project a risk object, which is an object having the risk, onto a glass of the vehicle based on a determination result obtained by the determining.

In addition, a processor of an embodiment may be configured to display the risk object such that the risk object is overlaid with a real object through AR graphics, when projecting the risk object onto the glass of the vehicle.

In addition, a processor of an embodiment may be configured to project the risk object in different colors according to the determination result, when projecting the risk object onto the glass of the vehicle.

In addition, a processor of an embodiment may be configured to sense an operation of a vehicle seat position of the vehicle, sense a movement of a seat in the vehicle, calculate a position of the seat in the vehicle based on a sensed position of the seat in the vehicle, and determine a position of the occupant based on the calculated position of the seat in the vehicle.

In addition, a processor of an embodiment may be configured to sense a gaze of the occupant based on the determined position of the occupant, and set the glass of the vehicle onto which the risk object is to be projected based on the sensed gaze of the occupant.

In addition, a processor of an embodiment may be configured to correct a focus of the object of the risk based on the set glass of the vehicle and the gaze of the occupant.

In addition, a processor of an embodiment may be configured to, in response to the determination result being greater than or equal to the preset risk level, output a notification of the risk of collision, and output the notification through at least one of visual, auditory, and tactile senses of the occupant.

In addition, a processor of an embodiment may be configured to, in response to the risk of collision being set to first to fourth levels, output differently the notification of the risk of collision or display differently a color of the risk object, according to the set first to fourth levels.

A smart notification device for a vehicle according to embodiments of the present disclosure may allow occupants in the vehicle to intuitively recognize a driving environment of an autonomous driving system when an autonomous driving function is used. For example, the smart notification device may project, onto the front, side, and rear windows of the vehicle, a route, road information, a nearby vehicle monitoring situation, a collision warning situation, and the like, of the autonomous driving system, using an AR HUD, and may thereby intuitively provide AR graphics overlaid on a real object.

In addition, a smart notification device of an embodiment may use seat and occupant information by using an occupant recognition unit and a vehicle recognition unit even when an occupant in the vehicle constantly moves their head and changes their gaze, and may also provide a high resolution at an accurate position as parallax correction and dynamic autofocus are performed in the AR HUD.

In addition, a smart notification device of an embodiment may interact with an object on a road in real time using the AR HUD and may thus allow the occupants in the vehicle to easily recognize a driving environment.

In addition, a smart notification device of an embodiment may improve the recognition of a driving situation even in an environment where the glass visibility is poor due to bad weather and the like using the AR HUD.

In addition, a smart notification device of an embodiment may form an environment where the autonomous driving system is recognized as a reliable environment by the occupants in the vehicle, with the expansion of autonomous driving level 4 (Lv. 4.

In addition, a smart notification device of an embodiment may accurately guide an intervention of the system to the occupants in the vehicle during emergency collision avoidance driving.

The effects to be obtained from an embodiment of the present disclosure are not necessarily limited to those described above, and other effects not described above can be apparent to one of ordinary skill in the art to which the present disclosure pertains from the following description.

BRIEF DESCRIPTION OF THE DRAWINGS

The above and other features and advantages of embodiments of the present disclosure can be more apparent from the following detailed description taken in conjunction with the accompanying drawings, in which.

DETAILED DESCRIPTION OF ILLUSTRATIVE EMBODIMENTS

Figure 1:
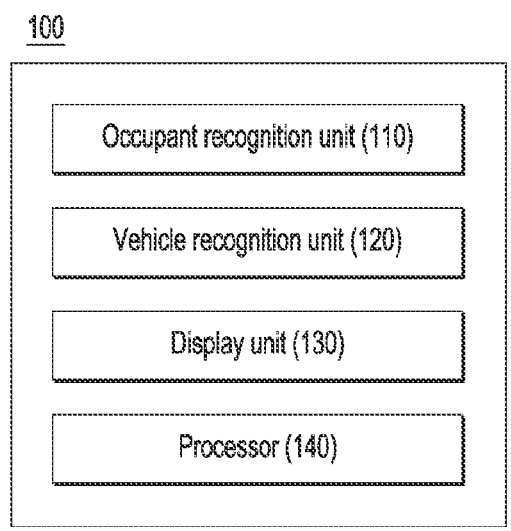
FIG. 1 is a diagram illustrating a smart notification device for a vehicle according to an embodiment of the present disclosure.

Hereinafter, embodiments of the present disclosure will be described in detail with reference to the accompanying drawings, and the same or similar elements can be given the same reference numerals regardless of reference symbols, and repeated description thereof can be omitted.

The terms "module," "unit," and/or "-er/or" for referring to elements can be assigned and used interchangeably in consideration of the convenience of description, and thus the terms per se do not necessarily have different meanings or functions. The terms "module," "unit," and/or "-er/or" do not necessarily require physical separation. For example, "OO module, unit, and/or -er/or" and "XX module, unit, and/or -er/or" may be components that perform different functions, and may not be physically separated but may perform the functions in parallel or in sequential order in the same microprocessor.

Further, in describing the embodiments of the present disclosure, when it is determined that a detailed description of related publicly known technology may obscure the gist of the embodiments described herein, the detailed description thereof may be omitted.

The accompanying drawings are used to illustrate various technical features, and it can be understood that embodiments described herein are not necessarily limited by the accompanying drawings. As such, embodiments of the present disclosure can be construed as extending to any alterations, equivalents, and substitutes, in addition to those that are particularly set out in the accompanying drawings.

Although terms including ordinal numbers, such as "first," "second," and the like, may be used herein to describe various elements, the elements are not limited by these terms. These terms can be merely used to distinguish one element from another.

In addition, in the description of the embodiments, when it is described as formed "on/above" or "under/below" an element, it may be construed that two elements are in direct contact, or the two elements can be in indirect contact with one or more other elements disposed therebetween, and these terms may be used only to describe a positional relationship therebetween.

For example, the expression "B is disposed, positioned, or located on A" may only indicate that B is shown on or above A in the accompanying drawings, unless otherwise defined or in a case where B needs to be disposed, positioned, or located above A due to the nature of A or B. In an actual product, B may be disposed, positioned, or located under/below A, or B and A may be disposed, positioned, or located side-by-side.

The term "and/or" is used to include any combination of multiple items that are subject to it. For example, "A and/or B" may include all three cases, for example, "A," "B," and "A and B."

When an element is described as "coupled" or "connected" to another element, the element may be directly coupled or connected to the other element. However, it is to be understood that another element may be present therebetween. In contrast, when an element is described as "directly coupled" or "directly connected" to another element, it is to be understood that there are no other elements therebetween.

The singular forms "a," "an," and "the" are intended to include the plural forms as well, unless the context clearly indicates otherwise.

It is to be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein can have the same meaning as commonly understood by one of ordinary skill in the art to which the present disclosure pertains. Terms, such as those defined in commonly used dictionaries, can be interpreted as having a meaning that is consistent with their meaning in the context of the relevant art and the present disclosure, and are not to be interpreted in an idealized or overly formal sense unless expressly so defined herein.

In addition, the term "unit" or "control unit" is merely a widely used term for naming a controller that controls a specific vehicle function, and does not necessarily mean a generic functional unit. For example, each controller may include a communication device that communicates with another controller or a sensor to control a function assigned thereto, a memory that stores an operating system (OS), a logic command, input/output information, and the like, and one or more processors that perform determination, calculation, decision, and the like that can be necessary for controlling a function assigned thereto.

Hereinafter, the operating principles and details of embodiments of the present disclosure will be described with reference to the accompanying drawings.

FIG. 1 is a diagram illustrating a smart notification device for a vehicle according to an embodiment of the present disclosure.

Referring to FIG. 1, a smart notification device 100 for a vehicle may include an occupant recognition unit 110, a vehicle recognition unit 120, a display unit 130, and a processor 140, which can operate to execute programs stored in related memory.

The occupant recognition unit 110 may check occupant state information of an occupant in the vehicle. The occupant recognition unit 110 may recognize the occupant state information (e.g., information indicating a seating position and a gaze of the occupant, a vehicle seat position, etc.) from sensor information collected from sensor(s) provided in the vehicle, example of which will be described in detail below.

The vehicle recognition unit 120 may check vehicle state information of the vehicle. The vehicle recognition unit 120 may check the vehicle state information (e.g., deceleration, acceleration, steering angle, fault diagnosis information, etc.) from the sensor information collected from the sensor(s) provided in the vehicle. The vehicle recognition unit 120 may include an electronic control unit (ECU) or a sensor connected to the ECU to measure a state or condition (e.g., transmission, vehicle body posture, airbags, tire air pressure, fuel amount, ignition timing, engine revolutions or speed, temperature, etc.) of each part provided in the vehicle.

The vehicle recognition unit 120 may also check driving information of the vehicle. The vehicle recognition unit 120 may check vehicle surrounding information (e.g., collision risk, emergency braking, etc.) based on the sensor information collected from the sensor(s). For example, the vehicle recognition unit 120 may include a blind spot warning (BSW) system, a forward collision warning (FCW) system, a smart cruise control (SCC) system, a precision navigation system, a turn signal, a signal recognition system (e.g., camera, V2X, etc.), an intelligent advanced driver assistance system (ADAS), a device (e.g., camera, radar, lidar, etc.) provided in the intelligent ADAS, or any combination thereof.

The display unit 130 may output a collision risk notification associated with a driving situation of the vehicle based on such various information provided from the occupant recognition unit 110 and the vehicle recognition unit 120, under the control of the processor 140. The collision risk notification may include a notification of a route of an autonomous driving system, road information, a nearby vehicle monitoring situation, a collision warning situation, an emergency braking situation, and the like.

The display unit 130 may be located inside the vehicle and display a risk object, which can be an object having a risk of collision, on at least one glass (or window) of the vehicle. The display unit 130 may be, for example, an augmented reality head-up display (AR HUD). The AR HUD may display augmented reality (AR) graphics superimposed on a real object by projecting the risk object onto the front, side, and rear windows of the vehicle, under the control of the processor 140. The real object may include a nearby vehicle, an object, a passerby or pedestrian, and the like around the vehicle. In addition, the risk object may be defined herein as an object that is superimposed on a real object and is displayed, through AR graphics. For example, the risk object may be displayed in a different shape corresponding to a shape of the real object. The display unit 130 may project the risk object in different colors according to the risk of collision, while displaying the risk object by superimposing the risk object on a real object according to the driving situation of the vehicle, a driver's driving situation, and autonomous driving intervention information, under the control of the processor 140. The risk object may be represented as AR graphics.

The processor 140 may set the risk of collision based on the occupant state information, the vehicle state information, and the driving information during autonomous driving, compare and analyze the set risk of collision with a preset risk level, and project, onto the glass of the vehicle, the risk object by varying the color of the risk object according to a comparison and analysis result obtained by the comparing and analyzing.

For example, when the risk of collision is less than or equal to the preset risk level, the processor 140 may display a real object recognized by the vehicle recognition unit 120 on the AR HUD. For example, the AR HUD may display at least one real object recognized by the vehicle recognition unit 120 on the front, side, and rear windows of the vehicle, under the control of the processor 140. The risk of collision may include a nearby vehicle monitoring situation, a collision warning situation, and the like.

For example, in an autonomous driving mode, the processor 140 may perform the comparison and analysis based on the present risk level that is previously set based on the occupant state information, acceleration/deceleration values verified through the vehicle state information, and the driving information, and project the risk object onto the glass of the vehicle according to a comparison and analysis result obtained by the comparison and analysis to provide it to the occupant. This will be described in detail below.

The AR HUD may analyze three-dimensional (3D) point cloud data or image data obtained through various sensors or an external device to generate position data and attribute data for 3D points and obtain information about a surrounding space or a real object, render the risk object to be output, and output the rendered object, under the control of the processor 140. For example, the AR HUD may output the risk object by matching the risk object including additional information about the recognized real object to the recognized real object.

However, examples are not limited thereto, and the AR HUD may perform the foregoing operations using a learning model including one or more artificial neural networks, under the control of the processor 140. For example, the AR HUD may recognize a real object from 3D point cloud data or image data using the learning model and provide a risk object corresponding to the recognized real object, under the control of the processor 140.

Figure 2:
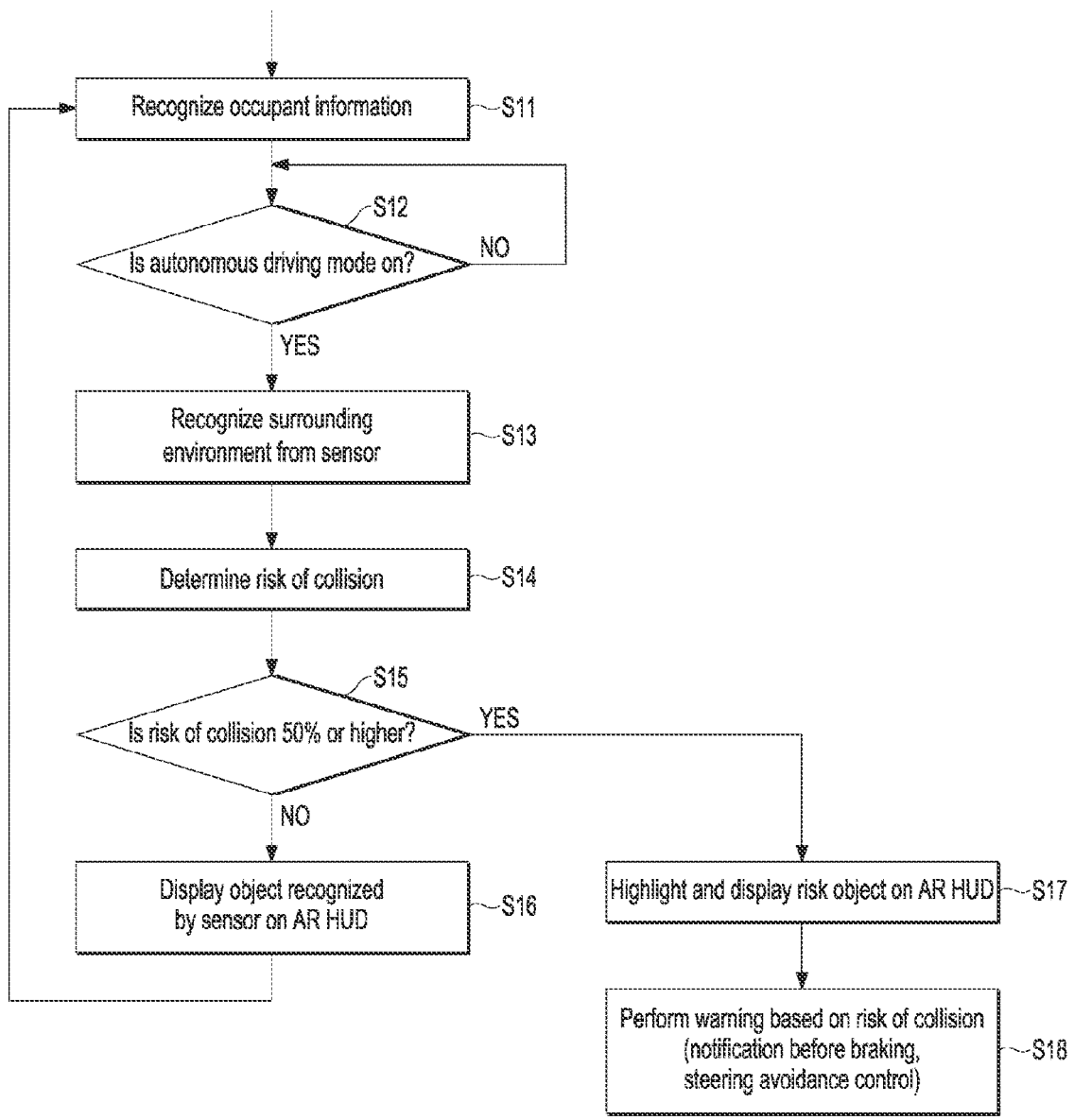
FIG. 2 is a diagram illustrating a method of a smart notification device for a vehicle according to an embodiment of the present disclosure.
Figure 3:
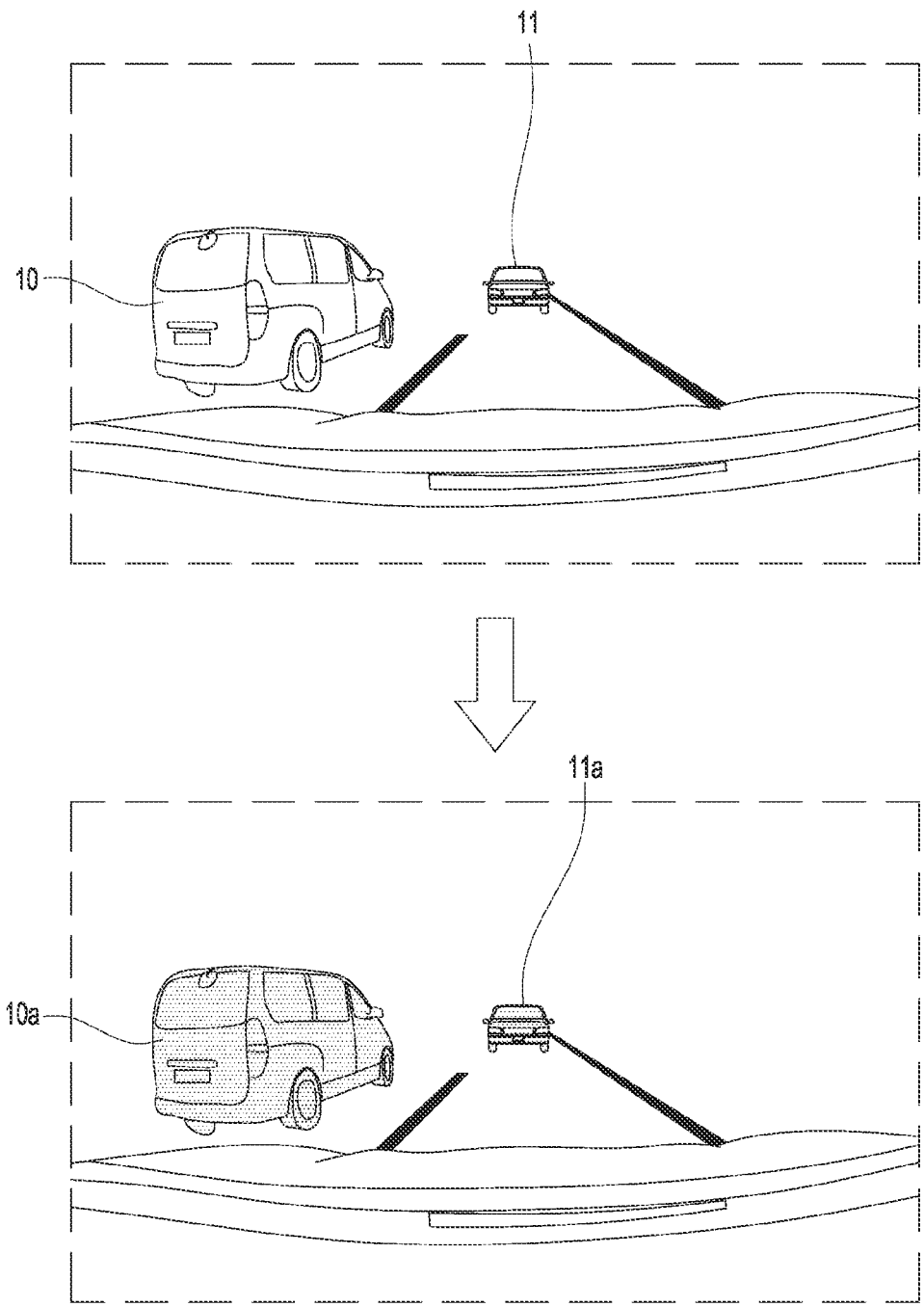
FIG. 3 is a diagram illustrating an example of displaying an object using an augmented reality head-up display (AR HUD) according to an embodiment of the present disclosure.

FIG. 2 is a diagram illustrating a method of a smart notification device for a vehicle according to an embodiment of the present disclosure. FIG. 3 is a diagram illustrating an example of displaying an object using an AR HUD according to an embodiment of the present disclosure.

A method of a smart notification device for a vehicle according to an embodiment of the present disclosure will be described as follows with reference to FIG. 2.

In operation S11, the occupant recognition unit 110 may recognize occupant state information of an occupant in the vehicle, under the control of the processor 140. The occupant recognition unit 110 may sense in real time the occupant in the vehicle and recognize the occupant state information based on sensor information obtained by the sensing, under the control of the processor 140. This will be described in detail below.

In operation S12, the processor 140 may check whether the vehicle is in an autonomous driving mode. For example, when the autonomous driving mode is selected by the occupant in the vehicle, the processor 140 may turn on the autonomous driving mode to allow the vehicle to switch to autonomous driving. However, examples are not limited thereto, and the vehicle may be switched to the autonomous driving mode in various ways.

In operation S13, the vehicle recognition unit 120 may check vehicle state information and vehicle driving information, under the control of the processor 140. For example, the processor 140 may receive the vehicle state information and the vehicle driving information from the vehicle recognition unit 120 and set a collision risk notification.

In operation S14, the processor 140 may analyze the vehicle state information and the vehicle driving information and determine a risk of collision based on an analysis result obtained by the analyzing.

The processor 140 may project a risk object onto a glass of the vehicle by varying a color of the risk object based on a preset risk level at which the determined risk of collision is set.

For example, as shown in the upper image of FIG. 3, when the determined risk of collision is less than the preset risk level ("No" in operation S15), the processor 140 may project an object or real object recognized by the vehicle recognition unit 120 onto an AR HUD in operation S16. For example, the AR HUD may project at least one object recognized by the vehicle recognition unit 120 onto the front, side, and rear windows of the vehicle, under the control of the processor 140.

Subsequently, the processor 140 may continue to collect information about an occupant in the vehicle through the occupant recognition unit 110 and recognize occupant information based on the collected information.

In contrary, as shown in the lower image of FIG. 3, when the determined risk of collision is greater than or equal to the preset risk level ("Yes" in operation S15), the processor 140 may project a risk object (which can be an object from which risk is determined) or a real object onto the AR HUD by highlighting the object in operation S17. For example, the AR HUD may display at least one risk object recognized by the vehicle recognition unit 120 in a different color on the front, side, and rear windows of the vehicle, and/or display the risk object by overlapping a warning mark, under the control of the processor 140.

In operation S18, the processor 140 may perform a warning according to the risk of collision using the AR HUD. Accordingly, the occupant in the vehicle may accurately recognize a surrounding environment of the vehicle that changes according to the risk of collision. For example, as the risk of collision increases, the processor 140 may display the displayed object in a darker color or display the displayed object as blinking, using the AR HUD. However, examples are not necessarily limited thereto, and other methods that allow the occupant to easily identify the risk object may also be used.

In addition, the processor 140 may notify the occupant in advance of vehicle braking, steering avoidance control, and the like, which may change according to the risk of collision, using the AR HUD. The occupant may recognize in advance a driving state of the vehicle that is currently driving and information about vehicles around the vehicle through the AR HUD, and may thus intuitively recognize a driving environment of the autonomous driving system.

Figure 4:
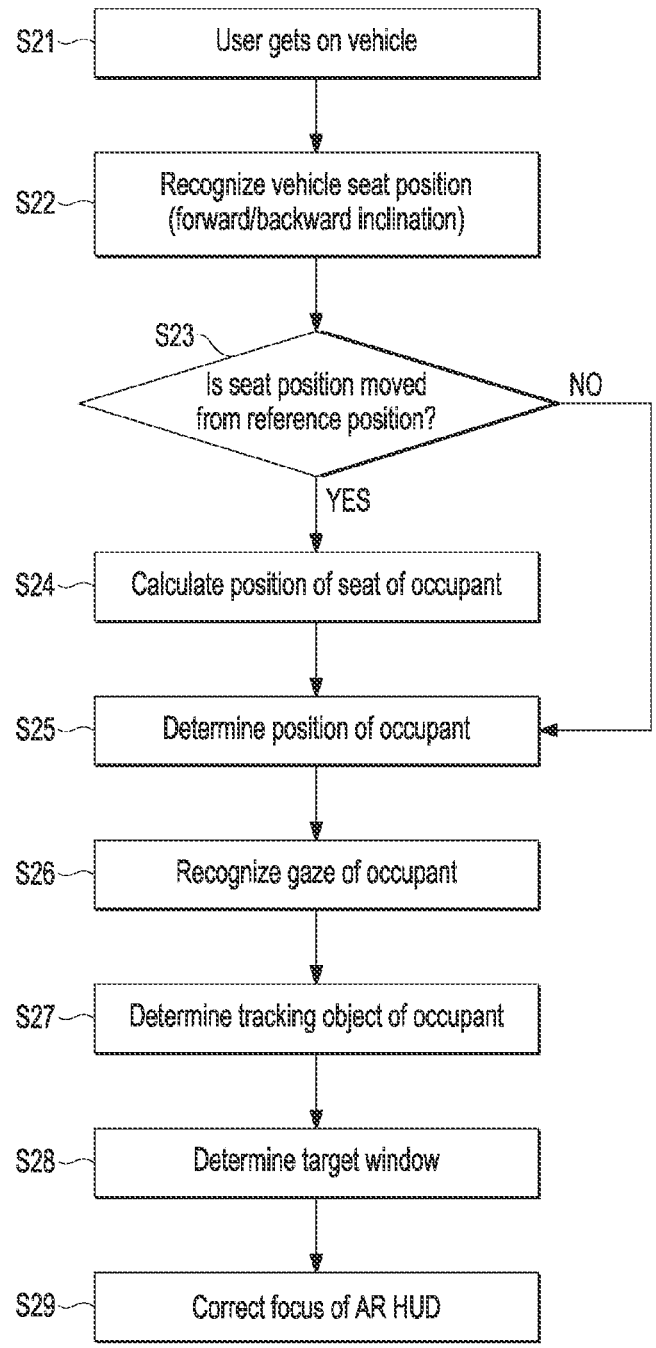
FIG. 4 is a diagram illustrating an operation of an occupant recognition unit according to an embodiment of the present disclosure.

FIG. 4 is a diagram illustrating an operation of an occupant recognition unit according to an embodiment of the present disclosure.

Referring to FIG. 4, the occupant recognition unit 110 may operate as follows under the control of the processor 140.

In operation S21, when an occupant gets into a vehicle, the occupant recognition unit 110 may recognize the presence of the occupant in the vehicle and collect occupant state information, under the control of the processor 140. The occupant described herein may also be referred to as a user.

In operation S22, the occupant recognition unit 110 may recognize seat information about a seat on which the occupant is seated in the vehicle, under the control of the processor 140. For example, the occupant recognition unit 110 may recognize whether a seat position of the vehicle operates after the occupant gets into the vehicle. For example, the occupant recognition unit 110 may detect whether the seat position moves forward or backward, or whether the inclination of the seat position is changed, after the embarkation of the occupant.

In operation S23, the occupant recognition unit 110 may check whether the seat position moves from a reference position under the control of the processor 140. For example, when the seat position moves from the reference position ("Yes" in operation S23), the occupant recognition unit 110 may calculate an occupant seat position, under the control of the processor 140.

In operation S25, the occupant recognition unit 110 may determine a position of the occupant based on the calculated occupant seat position. When the seat position does not move from the reference position ("No" in operation S23), the occupant recognition unit 110 may determine the position of the occupant under the control of the processor 140 in operation S25.

For example, the occupant recognition unit 110 may determine the position of the occupant using at least one sensor in the vehicle. The sensor(s) may include, for example, an occupant weight sensor, a pressure sensor, an electric sensor, other environmental sensors, or combinations thereof. In addition, the occupant recognition unit 110 may determine the position of the occupant by controlling a seat position adjustment and calculating a distance by a movement from the seat reference position, under the control of the processor 140.

In operation S26, when the position of the occupant is determined, the occupant recognition unit 110 may detect or recognize a gaze of the occupant, under the control of the processor 140. For example, the occupant recognition unit 110 may detect or recognize the gaze of the occupant through eye tracking, gesture detection, state detection, voice recognition, and the like. The occupant recognition unit 110 may also recognize the age and gender of the occupant.

In operation S27, the occupant recognition unit 110 may predict a real object located outside the vehicle based on the recognized gaze of the occupant and determine an object corresponding to the predicted real object as a tracking object of the occupant, under the control of the processor 140. The tracking object of the occupant may also be referred to herein as a risk object.

The AR HUD may display the risk object on one of the front, side, and rear windows of the vehicle based on the determined tracking object of the occupant, under the control of the processor 140. That is, the AR HUD may set the glass (or window) of the vehicle based on the tracking object of the occupant (S28) and project the risk object onto the set glass of the vehicle, under the control of the processor 140. The glass of the vehicle may also be referred to herein as a risk-projected target glass.

In operation S29, the processor may correct a focus of the AR HUD based on the gaze of the occupant obtained through eye tracking, and project the corrected focus of the AR HUD onto the glass of the vehicle.

Figure 5:
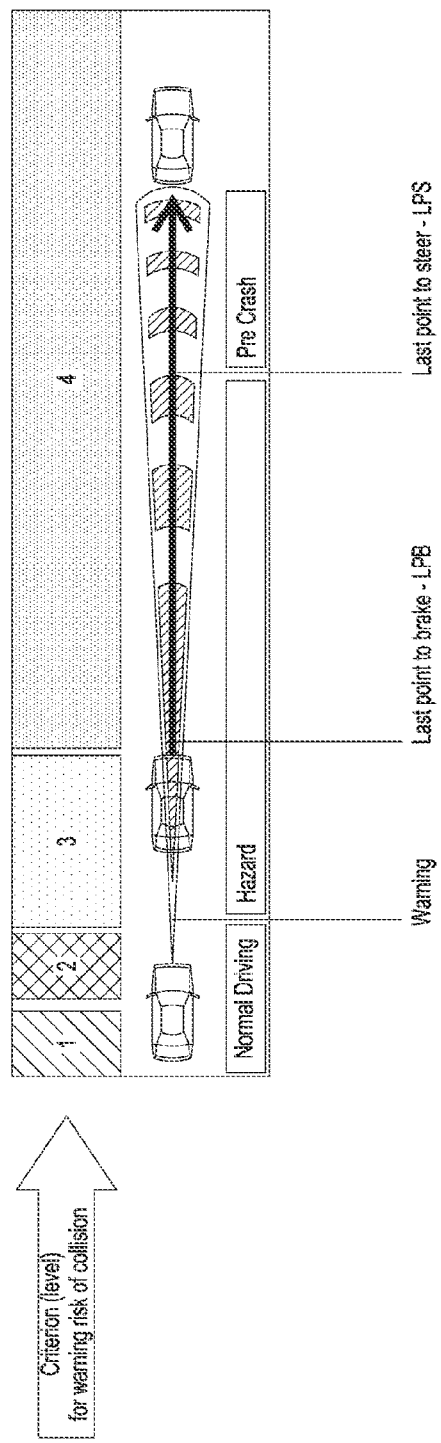
FIG. 5 is a diagram illustrating a criterion for warning a risk of collision according to an embodiment of the present disclosure.
Figure 6A:
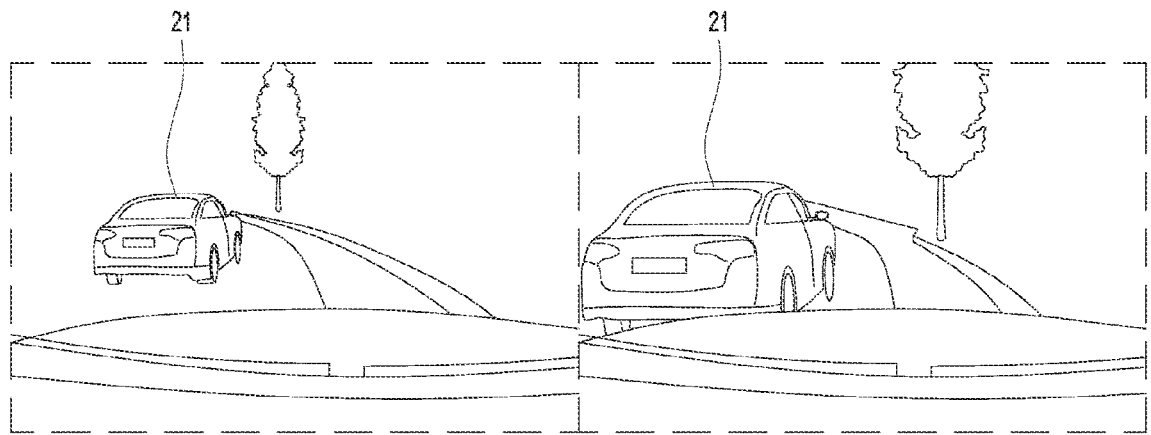
FIGS. 6A and 6B are diagrams illustrating example images obtained from an experiment on a real road according to FIG. 5.
Figure 6B:
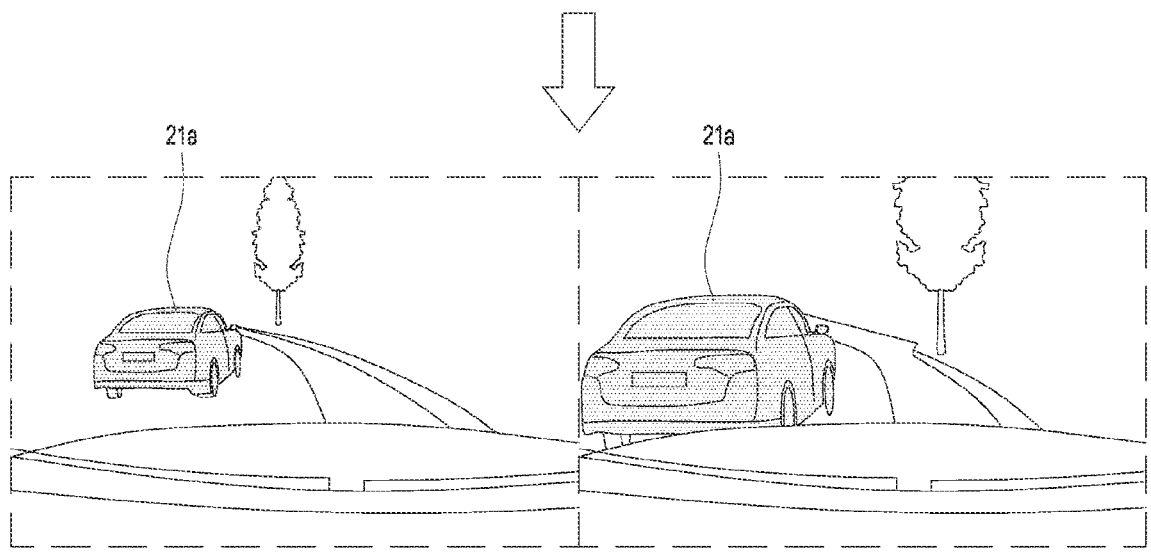

FIG. 5 is a diagram illustrating a criterion for warning a risk of collision according to an embodiment of the present disclosure. FIGS. 6A and 6B are diagrams illustrating example images obtained from an experiment on a real road according to FIG. 5.

Referring to FIG. 5, the processor 140 may output a notification for level 1 through the display unit 130 when a real object from which a risk of collision is detected is located out of a preset distance range from a vehicle that is driving, and may output one of notifications for level 2 to level 4 through the display unit 130 when the real object is located within the preset distance range from the vehicle.

Level 1, which is indicated as "1" in FIG. 5, may indicate that an autonomous vehicle recognizes a risk object tracked by an occupant, and may be displayed in blue on an AR HUD provided in the vehicle, for example.

Level 2, which is indicated as "2" in FIG. 5, may indicate a case in which a risk of collision is 30% or greater and is increasing, and may be displayed in yellow on the AR HUD provided in the vehicle, for example.

Level 3, which is indicated as "3" in FIG. 5, may indicate a case that accords with a criterion for operating collision avoidance warning and partial braking, and may be displayed in red on the AR HUD provided in the vehicle, for example.

Level 4, which is indicated as "4" in FIG. 5, may indicate a case in which a risk of collision accords with a criterion for operating collision avoidance logic (e.g., full braking and steering avoidance) and may be displayed in blinking red on the AR HUD provided in the vehicle, for example. In the case of level 4, the processor 140 may notify that the system operates urgently by an auditory and tactile warning along with the blinking red on the AR HUD. In addition, the processor 140 may control the AR HUD to overlap and display a risk object or a warning mark. The risk object may also be referred to as a target object.

FIG. 6B shows an operation of an AR HUD according to an embodiment of the present disclosure.

For example, as shown in FIG. 6B, the processor 140 may display a risk object on the AR HUD using forward collision-avoidance assist (FCA). The AR HUD may overlap and display a color on at least one risk object 21*a* recognized by the vehicle recognition unit 120, under the control of the processor 140.

For example, level 2 may be referred to as a general warning level. At level 2, the processor 140 may provide a collision risk notification to an occupant through visual and auditory means. The collision risk notification may also be referred to as a warning notification.

The visual notification may be a color or color change according to a risk level using the AR HUD. For example, at level 2, the AR HUD may display yellow, and the auditory notification may be a warning sound. For example, at level 2, the AR HUD may output a simple warning message or a simple warning sound.

For example, level 3 may be referred to as a collision avoidance warning and partial braking level. At level 3, the processor 140 may provide a warning notification to an occupant through visual, auditory, and tactile means, for example. The visual notification may be a color or color change according to a risk level using the AR HUD. For example, at level 3, the AR HUD may display red, and the auditory notification may be a warning sound. For example, at level 3, the AR HUD may output a danger detection warning message or a danger detection warning sound. The tactile notification may be seat vibration, seat belt tightening, and the like, for example. For example, the processor 140 may vibrate a seat on which an occupant is seated or adjust a seat position to a seat position that may protect the occupant most safely in preparation for a potential collision, through the vehicle recognition unit 120 or the like. In addition, the seat belt tightening may be adjusted such that an occupant may be safely protected in case of a collision.

For example, level 4 may be referred to as a collision avoidance warning, full braking, and steering avoidance level. At level 4, the processor 140 may provide a warning notification to an occupant through visual, auditory, or tactile means, for example. For example, at level 4, the AR HUD may display blinking red. The auditory notification may be a warning sound. For example, at level 4, the AR HUD may output a danger warning message or a danger warning sound. The tactile notification may be seat vibration, seat belt tightening, and the like. For example, the processor 140 may vibrate a seat on which an occupant is seated or adjust a seat position that may protect the occupant most safely in preparation for a potential collision, through the vehicle recognition unit 120 or the like. In addition, the seat belt tightening may be adjusted such that an occupant may be safely protected in case of a collision.

In addition, when a potential collision or crash with an object from which a risk is determined is recognized, the processor 140 may control an airbag activation time, and may control steering avoidance by determining the surroundings and position of the vehicle that is currently driving, for example.

Figure 7A:
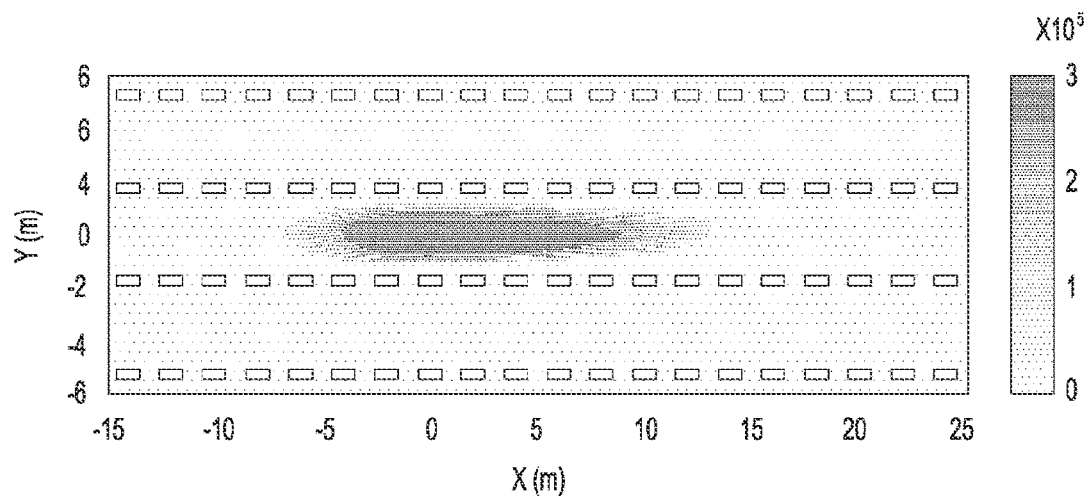
FIGS. 7A and 7B are graphs illustrating a method of calculating a risk of collision according to an embodiment of the present disclosure.
Figure 7B:
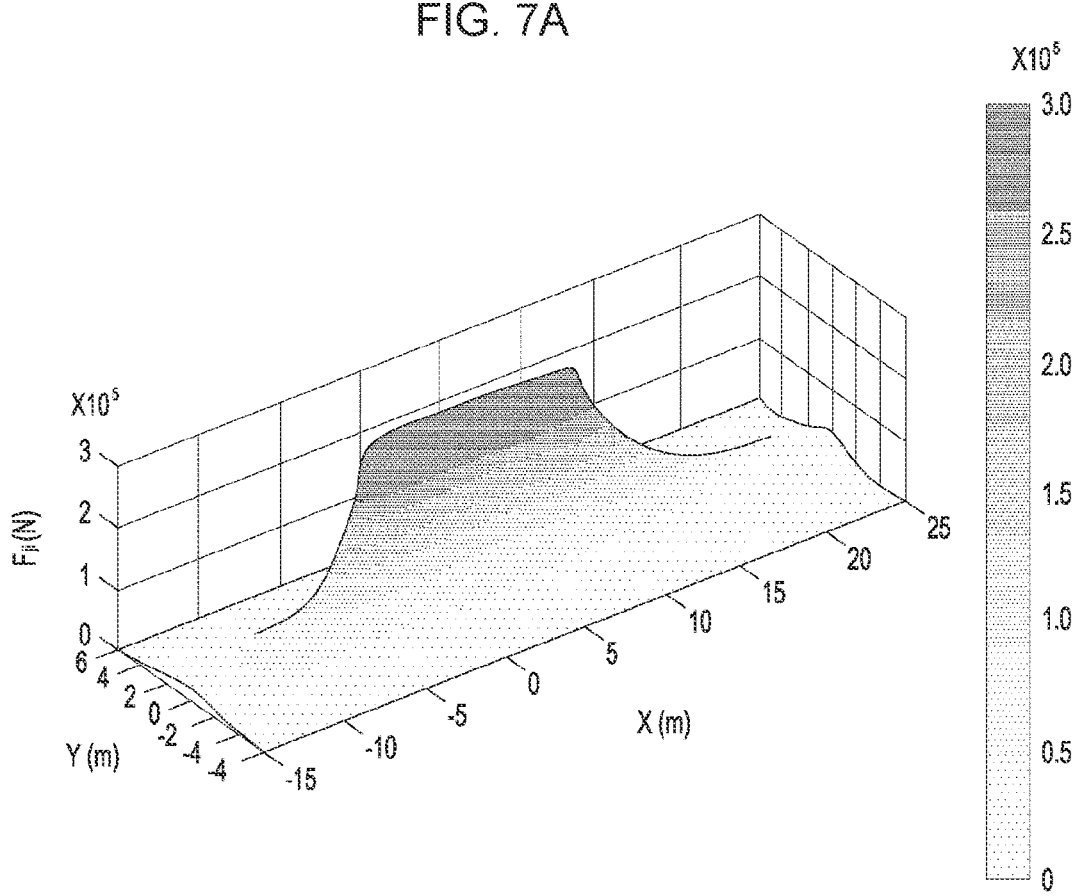

FIGS. 7A and 7B are graphs illustrating a method of calculating a risk of collision according to an embodiment of the present disclosure.

Referring to FIGS. 7A and 7B, the processor 140 may calculate a risk level using an artificial potential field (APF) algorithm.

Using the APF algorithm, the processor 140 may assume an imaginary force field that generates an attractive potential between a vehicle and a target point and generates a repulsive potential between the vehicle and a risk object, and calculate a risk level as represented in Equation 1 below.

$$p_o = e^{-((w_1(X-X_o)^2 + (w_2(Y-Y_o)^2)} \quad [\text{Equation 1}]$$

In Equation 1 above, $p_o$ denotes a potential (repulsive potential) of an object, $w_1$ denotes the weight for a longitudinal movement, and $w_2$ denotes the weight for a lateral movement.

The processor 140 may calculate a potential field value for a nearby risk object to determine the risk level, using the APF algorithm.

The processor 140 may predict an attractive potential, which is a moving path of a host vehicle, by applying yaw of the host vehicle and a speed of a nearby vehicle and calculate a repulsive potential from a risk object to determine the risk level.

The processor 140 may calculate the repulsive potential for a nearby vehicle through the APF algorithm, which may be represented as shown in FIGS. 7A and 7B. In FIGS. 7A and 7B, X(m) indicates a first direction and Y(m) indicates a direction crossing the first direction. X(m) and Y(m) may represent a sensor-recognized detection area. And, Z(N) indicates a direction crossing the first direction and the second direction, which may represent the risk level.

It may be verified from graphs shown in FIGS. 7A and 7B that the vehicle has a high risk from the center of the vehicle recognized by a sensor. In addition to the sensor-recognized detection area, the uncertainty (e.g., uncertainty in detecting a location of a target vehicle by an influence of noise, uncertainty in changing a moving path of a driver of the target vehicle, etc.) may be considered to determine the risk level. The target vehicle described herein may be an object from which a risk is determined.

Figure 8:
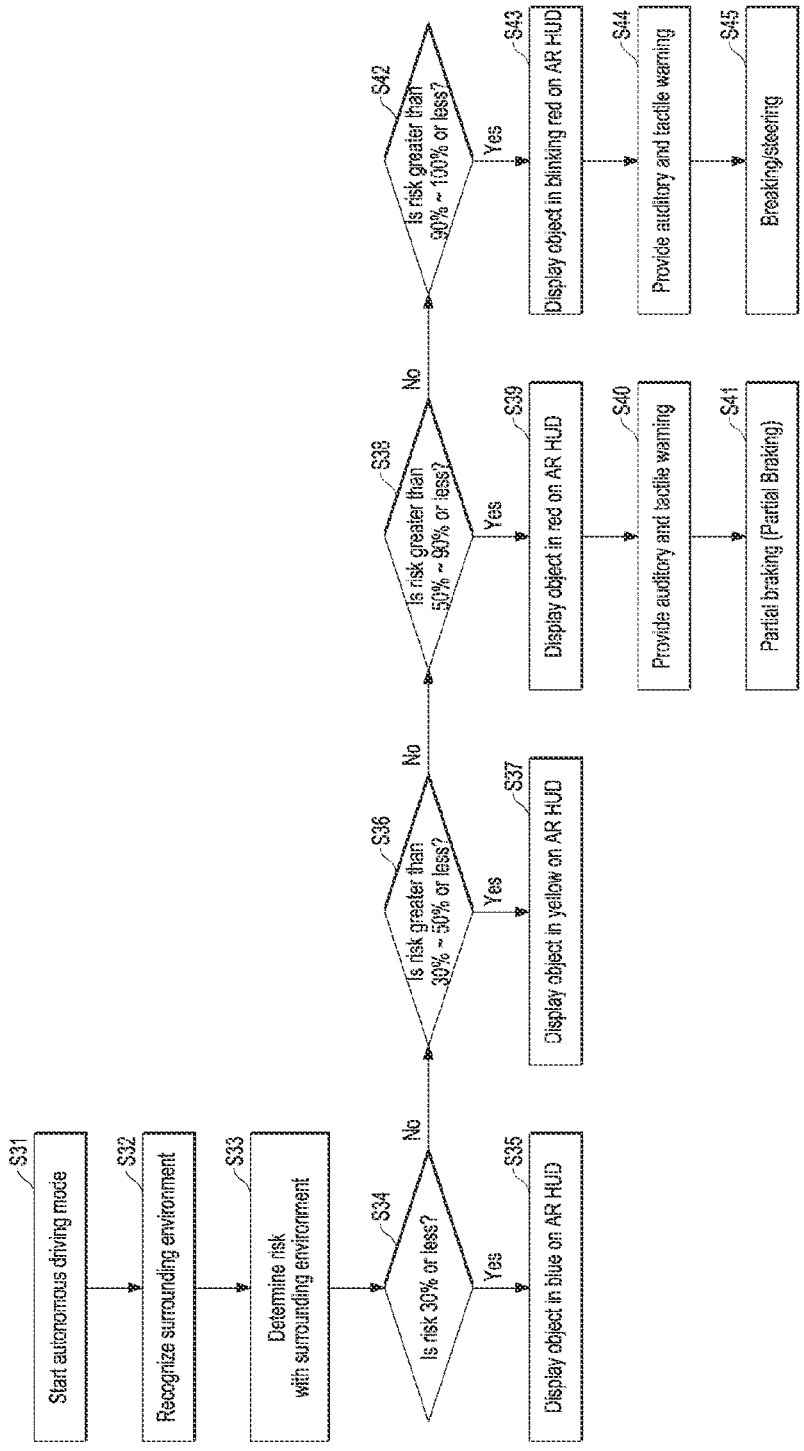
FIG. 8 is a diagram illustrating another method of a smart notification device for a vehicle according to an embodiment of the present disclosure.

FIG. 8 is a diagram illustrating a method of a smart notification device for a vehicle according to an embodiment of the present disclosure.

In operation S31, the processor 140 may check whether a vehicle is in an autonomous driving mode. For example, when the autonomous driving mode is selected by an occupant in the vehicle, the processor 140 may turn on the autonomous driving mode to switch the vehicle to autonomous driving. However, embodiments are not limited thereto, and the vehicle may also be switched to the autonomous driving mode in various ways.

In operation S32, the vehicle recognition unit 120 may check vehicle state information and vehicle driving information of the vehicle, under the control of the processor 140. For example, the processor 140 may receive the vehicle state information and the vehicle driving information from the vehicle recognition unit 120, and recognize surrounding information, driving information (e.g., collision risk, emergency braking, etc.), and the like, in addition to deceleration, acceleration, and steering angle information of the vehicle.

In operation S33, the processor 140 may analyze the vehicle state information and the vehicle driving information and determine a risk of collision based on an analysis result obtained by the analyzing. The risk of collision may be set to one or more levels of risk.

For example, in operations S34, S36, S38, and S42, the risk of collision may be set to first to fourth levels. In this example, the first level may be a level at which the risk of collision is 30% or less (operation S34), the second level may be a level at which the risk of collision is 30% or higher and 50% or less (operation S36), the third level may be a level at which the risk of collision is 50% or higher and 90% or less (operation S38), and the fourth level may be a level at which the risk of collision is 90% or higher and 100% or less (operation S42).

The processor 140 may display information and warnings on the display unit 130 differently in response to a preset risk level at which the determined risk of collision is preset.

When the determined risk of collision is included in the first level in operation S34, the processor 140 may display an object recognized by the vehicle recognition unit 120 on one of or any combination of the front, side, and rear windows of the vehicle using an AR HUD. For example, the AR HUD may display at least one object recognized by the vehicle recognition unit 120 in blue under the control of the processor 140 in operation S35.

When the determined risk of collision is included in the second level in operation S36, the processor 140 may display at least one object recognized by the vehicle recognition unit 120 in yellow using the AR HUD in operation S37.

When the determined risk of collision is included in the third level in operation S38, the processor 140 may display at least one object recognized by the vehicle recognition unit 120 in red using the AR HUD in operation S39. Subsequently, an auditory and tactile warning notification may be provided in operation S40 and braking avoidance may be performed in operation S41, and detailed descriptions thereof have been provided above with reference to FIGS. 5 to 7B and will not be repeated here.

When the determined risk of collision is included in the fourth level in operation S42, the processor 140 may display at least one object recognized by the vehicle recognition unit 120 in blinking red using the AR HUD in operation S39. Subsequently, an auditory and tactile warning notification may be provided in operation S44 and braking/steering avoidance may be performed in operation S45, and detailed descriptions thereof have been provided above with reference to FIGS. 5 to 7B and will not be repeated here.

As described above, a smart notification device for a vehicle according to an embodiment of the present disclosure may display in real time a warning according to a risk of collision on a glass (or window(s)) of the vehicle using an AR HUD system, and may allow an occupant in the vehicle to accurately recognize a surrounding environment of the vehicle that changes according to the risk of collision.

A smart notification device for a vehicle according to an embodiment of the present disclosure may notify in advance an occupant in the vehicle of braking and steering avoidance control of the vehicle that changes according to a risk of collision, using an AR HUD, and may thus allow the occupant to recognize in advance information about a driving state of the vehicle that is currently driving and about a nearby vehicle around the vehicle and to intuitively recognize a driving environment of an autonomous driving system.

A smart notification device for a vehicle according to embodiments of the present disclosure described herein may allow an occupant in the vehicle to intuitively recognize a driving environment of an autonomous driving system when using an autonomous driving function. For example, the smart notification device may project, onto one of or a combination of the front, side, and rear windows of the vehicle, a route, road information, a nearby vehicle monitoring situation, a collision warning situation, and the like, of the autonomous driving system, using an AR HUD system, and may overlay AR graphics on a real object to provide an intuitive notification.

In addition, a smart notification device of an embodiment may also use seat and occupant information, using an occupant recognition unit and a vehicle recognition unit, even when the occupant in the vehicle constantly moves his/her head and changes his/her gaze, and may also provide an accurate position in a clear resolution as parallax correction and dynamic autofocus are performed in the AR-HUD system.

In addition, a smart notification device of an embodiment may interact with objects on a road in real time using the AR HUD system, and may thus allow the occupant in the vehicle to easily recognize a driving environment.

In addition, a smart notification device of an embodiment may improve driving situation recognition even in an environment where the visibility through the glass of the vehicle is poor due to, for example, bad weather, using the AR HUD system.

In addition, a smart notification device of an embodiment may form an environment where the autonomous driving system is recognized as a reliable environment by the occupant in the vehicle, with the expansion of autonomous driving level 4 (Lv. 4).

In addition, a smart notification device of an embodiment may accurately guide an intervention of the system to the occupant in the vehicle in the case of emergency collision avoidance driving.

The embodiments described herein may be implemented in the form of a recording medium storing instructions executable by a computer. The instructions may be stored in the form of program code, and when executed by one or more processors, generates a program module to perform operations of the embodiments. The recording medium may be implemented as a computer-readable recording medium.

Examples of the computer-readable medium include a read-only memory (ROM), a random-access memory (RAM), a magnetic tape, a magnetic disk, a flash memory, an optical data storage device, and the like, for example.

The embodiments have been described with reference to the accompanying drawings. It can be understood by one of ordinary skill in the art to which the present disclosure pertains that the embodiments of the present disclosure may also be implemented in a form different from the embodiments disclosed herein without changing the technical spirit or essential features of the present disclosure. The embodiments are provided for illustrative purposes and should not be construed as limiting the present disclosure.

What is claimed is:

1. A method of operating a smart notification device for a vehicle configured for autonomous driving, the method comprising:
    sensing occupant state information of an occupant in the vehicle;
    sensing vehicle state information and driving information of the vehicle;
    collecting the occupant state information, the vehicle state information, and the driving information to obtain collected information;
    setting a collision risk based on the collected information;
    determining the collision risk based on a preset risk level;
    projecting a risk object corresponding to the collision risk onto a glass of the vehicle based on a determination result obtained by the determining; and
    outputting a notification of the collision risk differently according to the determination result,
    wherein:
        the notification of the collision risk is presented in a plurality of ways comprising a visual notification, a tactile notification, and an auditory notification, and
        the tactile notification adjusts a seat position and seat belt tightening to protect the occupant in preparation for a potential collision when the collision risk is higher than 50%.

2. The method of claim 1, wherein projecting the risk object onto the glass of the vehicle comprises displaying the risk object such that the risk object is overlaid with a real object through augmented reality (AR) graphics.

3. The method of claim 2, wherein projecting the risk object onto the glass of the vehicle further comprises projecting the risk object in different colors according to the determination result.

4. The method of claim 1, further comprising:
    sensing an operation of the seat position of the vehicle;
    sensing a movement of a seat in the vehicle;
    calculating the seat position of the seat in the vehicle based on a sensed position of the seat in the vehicle to obtain a calculated seat position; and
    determining an occupant position of the occupant based on the calculated seat position to obtain a determined position of the occupant.

5. The method of claim 4, comprising:
    sensing a gaze of the occupant based on the determined position of the occupant to obtain a sensed gaze; and
    setting the glass of the vehicle onto which the risk object is to be projected based on the sensed gaze of the occupant to obtain a set glass.

6. The method of claim 5, comprising correcting a focus of the risk object based on the set glass of the vehicle and the sensed gaze of the occupant.

7. The method of claim 1, comprising:
    displaying a color of the risk object differently according to the determination result.

8. A smart notification device for a vehicle comprising:
a processor; and
memory,
wherein the processor, when executing code stored in the memory, is configured to:
receive, from at least one sensor of the vehicle, occupant state information of an occupant in the vehicle;
receive, from the at least one sensor of the vehicle, vehicle state information and vehicle driving information;
collect the occupant state information, the vehicle state information, and the vehicle driving information to obtain collected information;
set a collision risk based on the collected information;
determine the collision risk based on a preset risk level;
project a risk object corresponding to the collision risk onto a glass of the vehicle based on a determination result obtained by the determining; and
output a notification of the collision risk differently according to the determination result,
wherein:
the notification of the collision risk is presented in a plurality of ways comprising a visual notification, a tactile notification, and an auditory notification, and
the tactile notification adjusts a seat position and seat belt tightening to protect the occupant in preparation for a potential collision when the collision risk is higher than 50%.

9. The smart notification device of claim 8, wherein the processor, when executing the code stored in the memory, is further configured to display the risk object such that the risk object is overlaid with a real object through augmented reality (AR) graphics.

10. The smart notification device of claim 9, wherein the processor, when executing the code stored in the memory, is further configured to project the risk object in different colors according to the determination result.

11. The smart notification device of claim 8, wherein the processor, when executing the code stored in the memory, is further configured to:
calculate the seat position of a seat in the vehicle based on a sensed position of the seat in the vehicle to obtain a calculated seat position; and
determine an occupant position of the occupant based on the calculated seat position to obtain a determined position of the occupant.

12. The smart notification device of claim 11, wherein the processor, when executing the code stored in the memory, is further configured to:
receive a gaze of the occupant from the at least one sensor based on the determined position of the occupant to obtain a sensed gaze; and
set the glass of the vehicle onto which the risk object is to be projected based on the sensed gaze of the occupant to obtain a set glass.

13. The smart notification device of claim 12, wherein the processor, when executing the code stored in the memory, is further configured to correct a focus of the risk object based on the set glass of the vehicle and the sensed gaze of the occupant.

14. The smart notification device of claim 8, wherein the processor, when executing the code stored in the memory, is further configured to display a color of the risk object differently according to the determination result.

15. A smart notification device for a vehicle configured for autonomous driving, the smart notification device comprising:
an occupant recognition unit configured to sense occupant state information of an occupant in the vehicle;
a vehicle recognition unit configured to sense vehicle state information and driving information of the vehicle;
a memory storing computer-executable code;
a processor configured to access the memory and execute the code, wherein the code comprises instructions for the processor to:
collect the occupant state information, the vehicle state information, and the driving information to obtain collected information;
set a collision risk based on the collected information;
determine the collision risk based on a preset risk level, and
generate a risk object corresponding to the collision risk; and
an augmented reality (AR) graphics system configured to:
project the risk object onto a glass of the vehicle based on a determination result obtained by the determining; and
output a notification of the collision risk differently according to the determination result,
wherein:
the notification of the collision risk is presented in a plurality of ways comprising a visual notification, a tactile notification, and an auditory notification, and
the tactile notification adjusts a seat position and seat belt tightening to protect the occupant in preparation for a potential collision when the collision risk is higher than 50%.

* * * * *